United States Patent
Mestré

(10) Patent No.: US 9,582,796 B2
(45) Date of Patent: *Feb. 28, 2017

(54) COMBICARD TRANSACTION METHOD AND SYSTEM HAVING AN APPLICATION PARAMETER UPDATE MECHANISM

(71) Applicant: MasterCard International, Inc., Purchase, NY (US)

(72) Inventor: Patrick Mestré, Namur (BE)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,301

(22) Filed: Mar. 13, 2015

(65) Prior Publication Data
US 2015/0186867 A1 Jul. 2, 2015

Related U.S. Application Data

(63) Continuation of application No. 14/010,907, filed on Aug. 27, 2013, now Pat. No. 9,101,631, which is a
(Continued)

(51) Int. Cl.
G06K 5/00 (2006.01)
G06K 7/08 (2006.01)
(Continued)

(52) U.S. Cl.
CPC ....... *G06Q 20/3226* (2013.01); *G06Q 20/208* (2013.01); *G06Q 20/3229* (2013.01);
(Continued)

(58) Field of Classification Search
USPC .......................... 235/375, 380, 383, 451, 492
See application file for complete search history.

(56) References Cited

U.S. PATENT DOCUMENTS

| | | |
|---|---|---|
| 5,495,098 A | 2/1996 | Pailles et al. |
| 6,220,510 B1 | 4/2001 | Everett et al. |
| | (Continued) | |

FOREIGN PATENT DOCUMENTS

| | | |
|---|---|---|
| EP | 1163633 B1 | 6/2005 |
| FR | 2812101 A1 | 1/2002 |
| | (Continued) | |

OTHER PUBLICATIONS

Rankl, Wolfgang et al., "Smart Card Handbook, Fourth Edition", Jul. 19, 2010 (Jul. 19, 2010), Wiley, XP055147259, ISBN: 978-0-47-074367-6, (pp cover 2pgs +384-381 +484-491, 17 pages total).
(Continued)

*Primary Examiner* — Tuyen K Vo
(74) *Attorney, Agent, or Firm* — Buckley, Maschoff & Talwalkar LLC

(57) ABSTRACT

Systems, methods and IC card devices are described for updating parameters such as unblocking or blocking or re-blocking an application on an IC card device whereby an integrated circuit card device gets issued with one or more active applications and optionally one or more dormant applications. Post issuance, triggered by a cardholder action when using a primary application, the issuer will send a command, e.g. in the form of a script to the card that will update parameters of another application, e.g. to 'wake up' the or each dormant application. An on-card mechanism is provided for the deblocking of the dormant application while the primary application is active. For any further transactions performed with the card, the cardholder will be offered a choice between the unblocked applications on the card. Optionally the oncard mechanism can also block or re-block an application or perform other actions.

22 Claims, 4 Drawing Sheets

Related U.S. Application Data continuation of application No. 13/478,367, filed on May 23, 2012, now Pat. No. 8,544,735.

(60) Provisional application No. 61/488,985, filed on May 23, 2011.

(51) Int. Cl.
| | | |
|---|---|---|
| *G06K 19/06* | (2006.01) | |
| *G06Q 20/32* | (2012.01) | |
| *G06Q 20/34* | (2012.01) | |
| *G06Q 20/20* | (2012.01) | |
| *G06Q 20/38* | (2012.01) | |

(52) U.S. Cl.
CPC ....... *G06Q 20/3255* (2013.01); *G06Q 20/341* (2013.01); *G06Q 20/354* (2013.01); *G06Q 20/3552* (2013.01); *G06Q 20/3563* (2013.01); *G06Q 20/3829* (2013.01)

(56) References Cited

U.S. PATENT DOCUMENTS

| 6,256,690 | B1* | 7/2001 | Carper .................. G06F 9/544 235/492 |
| 6,339,766 | B1 | 1/2002 | Gephart |
| 6,619,554 | B1 | 9/2003 | Vestergaard et al. |
| 7,263,507 | B1 | 8/2007 | Brake, Jr. et al. |
| 7,580,859 | B2 | 8/2009 | Economy et al. |
| 7,588,180 | B1* | 9/2009 | Carmichael ........ G06K 7/10079 235/379 |
| 7,832,634 | B1* | 11/2010 | Bierbaum .............. G06Q 30/06 235/380 |
| 7,865,414 | B2 | 1/2011 | Fung et al. |
| 2001/0032154 | A1 | 10/2001 | Schummer |
| 2001/0047330 | A1 | 11/2001 | Gephart et al. |
| 2004/0065734 | A1 | 4/2004 | Piikivi |
| 2004/0117300 | A1 | 6/2004 | Jones et al. |
| 2004/0230536 | A1 | 11/2004 | Fung et al. |
| 2005/0156026 | A1* | 7/2005 | Ghosh .................. G06Q 20/045 235/380 |
| 2005/0167512 | A1 | 8/2005 | Minemura et al. |
| 2006/0280299 | A1 | 12/2006 | Przybilla |
| 2007/0017974 | A1* | 1/2007 | Joao ....................... G06Q 20/32 235/380 |
| 2007/0170256 | A1* | 7/2007 | Breitfuss ............. H04L 25/4904 235/451 |
| 2007/0230702 | A1* | 10/2007 | Puri ..................... H04L 63/068 380/270 |
| 2007/0235539 | A1* | 10/2007 | Sevanto ............. G06K 7/10237 235/451 |
| 2008/0010361 | A1 | 1/2008 | Jacobs et al. |
| 2008/0083827 | A1 | 4/2008 | Ho |
| 2008/0086645 | A1* | 4/2008 | Uchiyama ............... G06F 21/32 713/184 |
| 2009/0127333 | A1 | 5/2009 | Chamley et al. |
| 2010/0174599 | A1* | 7/2010 | Rosenblatt ............ G06Q 30/02 705/14.37 |
| 2010/0224683 | A1 | 9/2010 | Singh et al. |
| 2011/0099108 | A1 | 4/2011 | Fung et al. |
| 2012/0205451 | A1 | 8/2012 | Poidomani et al. |
| 2012/0298747 | A1 | 11/2012 | Mestré |
| 2013/0173456 | A1* | 7/2013 | Grigg .................. G06Q 20/3221 705/39 |

FOREIGN PATENT DOCUMENTS

| KR | 20100013363 A | 2/2010 |
| WO | 98/43212 A1 | 10/1998 |
| WO | 99/160300 A1 | 4/1999 |

OTHER PUBLICATIONS

Langer, Josef et al., "Anwendungen und Technik von Near Field Communication (NFC)", Sep. 16, 2010 (Sep. 16, 2010), Springer, Heidelgerg, XP055088161, ISBN: 978-3-64-205496-9, DOI: 10.1007/978-3-6242-05497-6, (pp. 1-265).

"Java Card 2.0 Programmers Guide", Draft v.0.1, Sun Microsystems Inc., Internet Article, Sep. 2, 1997 (Sep. 2, 1997), XP055064642, retrieved from the Internet: URL:http://ftp.gwdg.de/pub/languages/java/java.sun.com/javacard/JC20ProgGuide.pdf, [retrieved on May 29, 2013], 12 pgs.

Wikipedia: "EMV", Internet Article, May 21, 2011 (May 21, 2011), XP055147297, retrieved from the Internet:URL:http://en.wikipedia.org/w/index.php?title=EMV&oldid=430160678, [retrieved on Oct. 17, 2014], 15pgs.

Montgomery, Michael et al., "Secure Object Sharing in Java Card", USENIX Workshop on Smartcard Technology, Chicago, IL, May 11, 1999 (May 11, 1999), XP055147139, retrieved from the Internet:URL:http://static.unsenix.org/events/smartcard99/full_papers/montgomery/montegomery.pdf, [retrieved on Oct. 16, 2014], 10pgs.

Hans, Sebastian "Java Card Platform Overview", SIMagine Conference, Sep. 4-5, 2008, Prague, Chezch Republic, Sep. 5, 2008 (Sep. 5, 2008), XP055028698, retrieved from the Internet:URL:http://www.gemalto.com/simagine/2009/download/java_card_platform.pdf, [retrieved on Jun. 1, 2012], 35pgs.

Hendry, Mike "Multi-application Smart Cards: Technology and Applications", Jul. 23, 2007 (Jul. 23, 2007), Cambridge University Press, XP055147240, ISBN: 978-0-52-187384-0, (pp. 80-83) "Section 9.3.2 Card Manger", 4pgs.

Rankl, Wolfgang et al., "Smart Card Handbook, Fourth Edition", Jul. 19, 2010 (Jul. 19, 2010), Wiley, XP055217809, ISBN: 978-0-47-074367-6 pages ToC, 508-511, 735-760 (49 pages).

Miarkantonakis, Konstantinos et al., "Smart Cards" In: Hossein Bidgoli: "The Handbook of Technology Management, Supply Chain Management, Marketing and Advertising, and Global Management (vol. 2)", Jan. 12, 2010 (Jan. 12, 2010), Wiley, XP055218053, ISBN: 978-0-47-024948-2 pp. 249-252, 257-260.

EP Office Action dated Oct. 8, 2015 issued by the European Patent Office in counterpart EP Application No. 12789404.6.

* cited by examiner

COMBICARD TRANSACTION METHOD AND SYSTEM HAVING AN APPLICATION PARAMETER UPDATE MECHANISM

CROSS REFERENCE TO RELATED APPLICATIONS

This application is a continuation of U.S. patent application Ser. No. 14/010,907, filed Aug. 27, 2013 and entitled "COMBICARD TRANSACTION METHOD AND SYSTEM HAVING AN APPLICATION PARAMETER UPDATE MECHANISM", which is a continuation of U.S. patent application Ser. No. 13/478,367 filed May 23, 2012, now issued as U.S. Pat. No. 8,544,735, which claims benefit and priority of U.S. Provisional Application No. 61/488,985 filed on May 23, 2011, the contents of those applications are incorporated herein by reference.

FIELD

Embodiments of the present invention generally relate to a system and method for performing transactions with an integrated circuit card or smartcard with multiple applications thereon (such as a combicard or combocard) and more particularly relates to a system and method for updating parameters of an application such as deblocking a dormant application on such an integrated circuit card or smartcard.

BACKGROUND

With the advancement of the computer industry, the use of so-called integrated circuit cards or smartcards has become a preferred method of performing transactions on networks in many countries. For example such cards can be used as payment cards and this simplifies the purchase of goods and/or services by avoiding the necessity of using cash for such transactions while improving security compared to magstripe cards. These payment cards are often used in conjunction with electronic payment card or card accepting terminals (generally referred to herein as card reading terminals, point of sale terminals, or card readers).

Credit cards and debit cards are known. In recent years, an electronic wallet system has been suggested in which a monetary amount can be exchanged by communication between integrated circuit ("IC") cards or between an IC card and a point of sale ("POS") terminal. The IC card used for this system includes a microprocessor having a communication function and a memory such as electrically erasable programmable read-only memory ("EEPROM") for storing a processing program, such as the MONDEX™ electronic cash application developed by Mondex International, Ltd. The processing program is capable of configuring the IC card to function as a credit card, a debit card or an electronic cash card.

If configured to function as a cash card, the IC card can be used for offline commercial transactions of merchandises, commodities and the like, and to allow information or data representing a monetary amount to be stored in a memory incorporated in the IC card. When the IC card runs out of electronic cash, the cardholder must deposit additional cash onto the IC card using a specialized terminal.

A typical message flow is as follows:
1) The terminal selects the application to use for the transaction (e.g. credit application) e.g. after selection by the cardholder.
2) The application (e.g. credit) is activated. The application prepares a message for the Issuer. The terminal forwards this message to the Issuer.
3) Based on the received message, the Issuer prepares the response (i.e. accept or not the transaction) and, possibly, a script command to be processed by the active application. The Issuer can only prepare the response and the script command after receiving the request from application. The command is delivered by the terminal to the card.
4) The transaction is approved or declined and the script command is processed by the active application (credit).

It is inconvenient for consumers to carry multiple cards to conduct multiple types of transactions (such as one card for use as a debit card, and another card for use as a credit card). As a result, cards have been offered that allow a plurality of applications on one card. These cards are referred to herein as "combicards," "combo cards" or "multi-application cards".

In a typical transaction involving the purchase of an item or service, the payment device (such as the combo card or combicard) is presented at a point of sale terminal ("POS terminal"). The POS terminal has a card reader that can read data stored on the payment device. Dependent on whether the payment device is configured as a cash, credit or debit card or a combination of these, relevant identifying information for each application is displayed in some way to the user for selection. For the card to be configured as a cash card, credit card, debit card or other type of device, the cardholder must have obtained prior approval from the card issuer to use the application(s) and as a result, every application on the payment device must be authorized.

A user may only wish to use an application for a short period of time. For example, a traveler visiting another country may wish to use an application that allows the traveler to conduct transactions in the currency of the country she will be visiting. This would require loading the new application onto the card. It is known to place more than one application on such a card but to make some of them dormant or "blocked" such that they cannot be used and cannot be seen at the POS terminal. Such a blocked application can be unblocked by presenting the card at a dedicated terminal (e.g. at a bank branch terminal equipped with special software). In this case, if the user wishes to make use of a new application, the card is introduced into the dedicated terminal, and the application running on the dedicated terminal selects the application to unblock on the card. The application on the card is then activated for use. The application on the card then prepares a message for the Issuer. The terminal forwards this message to the Issuer. Based on the received message, the Issuer prepares a script command to unblock the active application. The Issuer can only prepare the response (causing the application to be unblocked for use) after receiving the request from the blocked application. The command is delivered by the terminal to the card and the application is unblocked. This message flow requires that a blocked application can be activated while still in the blocked state. This is typically only allowed in a safe environment, e.g. using a dedicated terminal within a bank's premises.

This is somewhat more convenient than having to load the complete new application onto the card. However it still requires that the user take the card to the location of the dedicated terminal and interact with the dedicated terminal to activate the application.

A further difficulty is that existing payment network infrastructures impose limitations on how communications can be made with an IC card at a POS terminal. Only one application can be activated at one time for security reasons. The payment networks allow for only one request, from only one application. An online authorization (e.g., such as a request for a payment authorization) can only be performed with an application that is not blocked. The issuer needs a request from the blocked application to unblock it, but as it is blocked this cannot occur. As a result, currently, blocked applications cannot be unblocked at the POS terminal. This causes an inconvenience to the issuer. It would be preferred if new applications could be made available to the user in a more flexible and convenient manner.

SUMMARY

An object of some embodiments of the present invention is to provide a method and system for providing a more flexible and convenient way to update parameters of an application, e.g. for unblocking of a dormant application and/or blocking or an application and/or re-blocking of a unblocked application on a combi- or combo IC card system. Another object of the present invention is to provide on a combi- or combo IC card for use with such a method and system. The card can be a payment device having a microprocessor adapted to provide more than one application.

In accordance with some embodiments of the present invention, a method of updating parameters such as unblocking or blocking or re-blocking an application on an IC card is provided whereby an integrated circuit card gets issued with one or more active applications and optionally one or more dormant applications. Post issuance, triggered by a cardholder action when using a primary application, the issuer will send a command, e.g. in the form of a script to the card that will update parameters of another application, e.g. to 'wake up' the or each dormant application. In an embodiment an on-card mechanism is provided for the deblocking of the dormant application while the primary application is active. For any further transactions performed with the card, the cardholder will be offered a choice between the unblocked applications on the card. Optionally the oncard mechanism can also block or re-block an application or perform other actions.

An advantage of some embodiments of the present invention is that the update of the parameter of a second application, e.g. unblocking or blocking or re-blocking can be done through an updating procedure that can be controlled by the issuer and applied by the card contemporaneously with the card's processing of a primary application without requiring a special dedicated terminal.

In one embodiment, the present invention provides a method of updating a parameter of a secondary application. For example, deblocking a dormant application on an IC card device during a transaction of a primary application between an issuer node and the IC card device via a terminal across a network, update information for the change of parameter, e.g. for deblocking the blocked secondary application, being routed through the network to the IC card device during a transaction of the primary application, each transaction being routed at an application layer from the issuer node to the terminal, the IC card device being issued by an issuer or an agent of the issuer, the update information being transferred by the terminal to the IC card device associated to a command of the primary application, and the IC card device being adapted to record the update information in non-volatile memory to thereby change the parameter of the secondary application, e.g. to thereby deblock the dormant application.

The updating of the secondary application occurs while the primary application is active. The method is applicable in systems where only one application on the IC card device can be active at one time.

The IC card can be a combo- or combicard having one microprocessor and associated non-volatile and volatile memory. The IC card can be a payment device.

A wireless and/or a wired connection can be used between the terminal and the IC card. In some cases a combination of wireless and wired communication may be used to further increase the level of security. A predefined sequence of commands may be for instance required to be transmitted or received individually over a certain interface. If the expected predefined sequence of commands is not maintained a security breach may be assumed. Such a process can of course only be implemented in cases where both types of interfaces are available at the card and at the location of use. Preferably the terminal and IC card are adapted such that the update information is transferred securely from the terminal to the IC card. Such a connection for securely transferring can include an error detection mechanism.

Embodiments of the present invention also provide a system for updating a parameter of a secondary application, e.g. deblocking a dormant application on an IC card device during a transaction of a primary application between an issuer node and the IC card device via a terminal across a network, the system being adapted to route update information for the change of parameter of the secondary application, e.g. for deblocking of the blocked secondary application, through the network to the IC card device during a transaction of the primary application, each transaction being routed at an application layer from the issuer node to the terminal, the IC card device being issued by an issuer or an agent of the issuer, the update information being transferred by the terminal to the IC card device associated to a command of the primary application, and the IC card device being adapted to record the update information in non-volatile memory to thereby change the parameter of the secondary application, e.g. to thereby deblock the dormant application.

The updating of the secondary application occurs while the primary application is active. The systems can be one where only one application on the IC card device can be active at one time.

A wireless and/or a wired connection can be used between the terminal and the IC card. In some cases a combination of wireless and wired communication may be used to further increase the level of security. A predefined sequence of commands may be for instance required to be transmitted or received individually over a certain interface. If the expected predefined sequence of commands is not maintained a security breach may be assumed. Such a process can of course only be implemented in cases where both types of interfaces are available at the card and at the location of use. Preferably the terminal and IC card are adapted such that the update information is transferred securely from the terminal to the IC card. Such a connection for securely transferring can include an error detection mechanism.

The IC card can be a combo- or combicard having one microprocessor and associated non-volatile and volatile memory. The IC card can be a payment device.

Embodiments of the present invention also provide an IC card device having at least a processor and a non-volatile memory, the IC card device being for use in a transaction of a primary application between an issuer node and the IC card device via a terminal across a network, the IC card device being adapted to process each transaction delivered at an application layer from the issuer node to the terminal, the IC card device being issued by an issuer or an agent of the issuer, the IC card device being adapted to receive update information transferred from the terminal to the IC card device associated to a command of the primary application, and the IC card device being adapted to record the update information in the non-volatile memory to thereby change a parameter of a secondary application, e.g. to thereby deblock a dormant application.

Either a wireless and/or a wired connection can be used between the terminal and the IC card. Preferably the terminal and IC card are adapted such that the update information is transferred securely from the terminal to the IC card. Such a connection for securely transferring can include an error detection mechanism.

The IC card can be a combo- or combicard having one microprocessor and associated non-volatile and volatile memory. The IC card can be a payment device.

The updating of the secondary application occurs while the primary application is active. The IC card device is for use in systems where only one application on the IC card device can be active at one time.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1A:
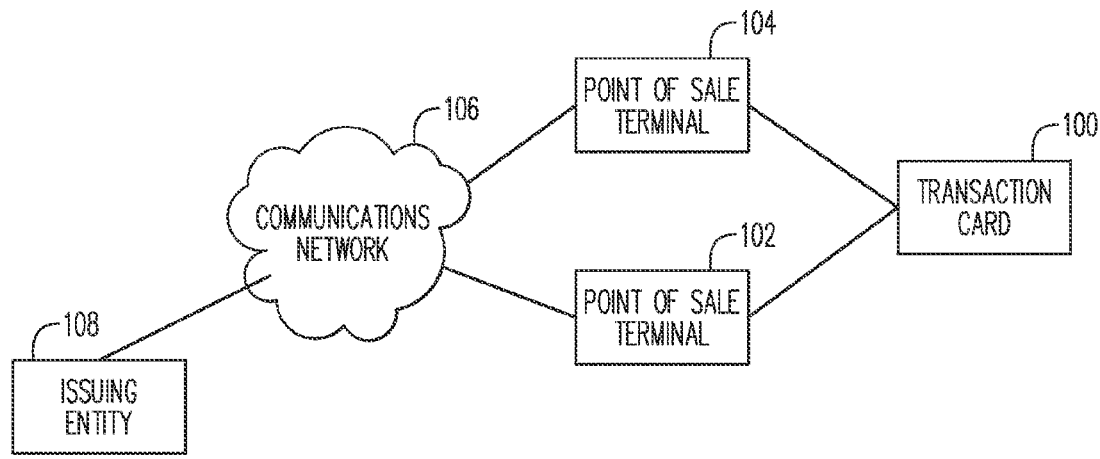
FIG. 1A is a diagram of the interacting components of a system according to an exemplary embodiment of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DEFINITIONS

The following abbreviations may be used in the description of the present invention:

| Abbreviation | Description |
| --- | --- |
| AC | Application Cryptogram |
| AID | Application Identifier |
| APDU | Application Protocol Data Unit |
| b | Binary |
| C-APDU | Command APDU |
| EEPROM | Electrically Erasable Programmable Read Only Memory |
| EMV | Europay MasterCard(R) Visa |
| FCI | File Control Information |
| ICC | Integrated Circuit Card |
| ID | Identifier |
| MAC | Message Authentication Code |
| PAN | Primary Account Number |
| PIN | Personal Identification Number |
| PTH | Previous Transaction History |
| RFU | Reserved for Future Use |
| R-APDU | Response APDU |
| SW12 | Status Word bytes 1-2 |
| TLV | Tag Length Value |
| Var. | Variable |

Other abbreviations may be used referring to messages and data specified in the EMV specifications available at http://www.emvco.com. As used herein, the term "payment device" is used to refer to any of a number of different payment devices such as, for example, a cash card, credit card or debit card. A "payment device" may be an IC card device or a smartcard or any device that has an embedded processing engine and memory such as a microchip. A smartcard is generally defined as a card (or other form of portable payment device) that has embedded in it a processing engine such as a microprocessor, and one or more solid state memories, or has embedded therein one or more solid state memories with non-programmable logic circuits. The solid state memories are at least non-volatile memories. It is preferred if the card device has both volatile and non-volatile memory. The processing engine can implement certain processing functions, such as to perform arithmetical operations, i.e. manipulate data stored in a solid state memory on the card. Preferably the IC card device can execute functions such as obtaining authentication from a remote site, encryption, storing and manipulating data, etc. In general, embodiments may be used with IC card devices operating pursuant to the EMV specification or other payment standards.

Such an IC card device or smartcard can be a contact card or a contactless card. A "contact card" has a means for storing information such as a microchip that can be contacted and read by a card reader through a physical contact of electrodes. A "contactless card" can communicate without the need for direct physical contact. Contactless cards can have a means for communicating at radio frequencies. A contactless card is also provided by a portable device such as a mobile phone or personal digital assistant (PDA) in which a smartcard such as a "SIM card" is embedded. The mobile device provides the RF technology for communication. A contactless card may be defined by a standard such as ISO 14443. A "smartcard" can also have both a contact and a contactless interface and can therefore be used as both a contact and a contactless card.

A combocard, combicard or multi-application card is an IC card with a microprocessor and memory that can activate more than one application stored on the card (but generally not at the same time).

As used herein, the term "script" refers to a command or instruction that, when supplied to the IC card device, results in execution of part of an application installed on the IC card device. A script may be used to set, reset, activate or deactivate, configure or reconfigure a function of the application or of the IC card device such as a counter stored in a memory. In embodiments of the present invention a script can be used to unblock a dormant application while a primary application is activated. "Data"—the present invention involves manipulation of data. Data can be transient or persistent data. Data is transient when it is lost after power is removed and has a lifespan limited to a single transaction. Some examples are: the Card Verification Results (CVR) and the PIN Verification Status (PVS).

Data is "persistent" when it is stored in memory that provides long-term retention (such as EEPROM) and when the data has a lifespan beyond a single transaction. Persistent data can be common to both contact and contactless interfaces or interface specific.

A network such as a "payment network" for use with the present invention can be of the type that typically includes an issuer node such as an issuer server, and a terminal or more usually a plurality of terminals connected in the network, e.g. payment network e.g. by wireless or wired connections. For example, terminals can be POS terminals, merchant terminals, bank terminals, home computers, PDA's, laptops, cell phones or mobile phones etc. Transmission across the network can be subject to errors and/or a bandwidth limitation. This bandwidth limitation can be due to the protocol that governs how a transaction is transmitted across the network. For example, the protocol may only allow a certain bit or byte size for certain messages such as those containing update information. In a network such as a payment network each transaction such as a financial transaction is routed at an application layer from the issuer node to the terminal. A message of the transaction is transferred from the terminal to the payment device. One component of a transaction delivered to the IC card device is update information. This update information can change an entry or flag that signifies that a parameter of a secondary application has been changed, e.g. an application is blocked or unblocked or has another status. Recording the update information in non-volatile memory changes an entry or flag to thereby change the parameter of the secondary application, e.g. block, unblock or reblock an application that is to run on the IC card device. The network may use message switching rather than packet switching. A transaction such as a financial transaction is then transferred as a message which is routed in its entirety and as a separate entity from the issuer node to the IC card device. Each message contains addressing information, and at each node or switch of the network this information is read and the transfer path to the next node or switch is decided. Typically each message is stored (usually on hard drive due to RAM limitations) before being transmitted to the next node or switch. Hence the payment network could be a 'store-and-forward' network.

DETAILED DESCRIPTION

Embodiments of the present invention relate to systems, apparatuses and methods for performing transactions such as payment transactions. In order to explain the present invention in more detail, the present invention will be explained based on systems, apparatuses and methods for performing payment transactions using a payment device that can be a contactless or contact payment device which has a contact or contactless communication interface. An example of a contactless interface is that provided by an integrated circuit chip embedded in a wireless mobile device. A contact interface can be provided by a payment card having an integrated circuit chip that can be inserted into card reader, e.g. at a point of sale terminal, and read by physical contact with electrodes. Embodiments of the invention may be used to conduct payment transactions and to change a parameter of an application that is not active, e.g. to unblock, block or reblock an application stored in a payment device.

Embodiments of the present invention relate to technical solutions to address the problem of ease of access to more than one application on an IC circuit card to allow a parameter of an application to be updated when the application is not active. In particular one problem that is addressed is how to allow activation of a dormant application on an IC card without requiring a specially dedicated terminal with which it is communicating.

Embodiments of the present invention address the issue that when a parameter of a non-activated application is to be updated, e.g. to deblock an application, the change in parameter is written to non-volatile memory. In this process the deblocked application does not have to be activated and in some systems cannot be activated at the same time as the primary application.

In accordance with the system and methods of some embodiments of the present invention, a consumer can use an IC circuit card to make purchases at a point of sale ("POS") terminal. The present invention will mainly be described with reference to a financial transaction such as a purchase transaction a payment card system (such as the MasterCard® network) from the issuer bank (i.e. the bank which issued the card) but the present invention is not limited thereto.

Each of the at least one POS terminals (which could be a personal computer, a personal digital assistant, cell phone, or the like) has a processor, interface hardware, and interface software configured to interact with the IC card device e.g. payment device. If not embedded in the interface hardware, the POS terminal may have a separate card reader. Also part of the system are external networks for transmitting over communication lines financial and banking information. The present invention facilitates the purchase of goods and services at a POS terminal without using paper currency even using a dormant application.

The transaction card is preferably an integrated circuit ("IC") card (also called a "smartcard"), which is typically the size of a conventional credit card, but which contains a processing engine such as a microprocessor, and memory, e.g. at least non-volatile memory. The card can be used to perform financial transactions in various modes. In the preferred embodiment, the payment device such as the IC card can perform more than one application, e.g. credit, debit, pre-authorized amount or electronic cash card functions, loyalty or bonus schemes, or any combination of these. Transaction data can also be recorded on the card.

The system, as illustrated in FIG. 1A, preferably includes a payment device such as an IC card device 100, POS terminals 102, 104, a communications network 106 and an issuing entity 108, each of which will now be briefly described. The payment device such as the IC card device 100 includes at least one primary application such as a payment application which allows the payment device such as the IC card device 100 to carry out financial transactions as a credit card, a debit card, a pre-authorized amount card or an electronic cash card as well as at least dormant or blocked application. Each of the POS terminals 102, 104 executes a POS terminal application, which may be integrated with an electronic reader such as a card reader. In particular, the reader reads information stored in the payment device such as the IC card device 100, and the POS terminal 102, 104 acts upon the received information. The communications network 106 allows the POS terminals 102, 104 to communicate through a payment network (as defined above but not shown) with the issuing entity 108. The communications network 106 carries information from the POS terminals 102, 104 through the payment network to the issuing entity 108 detailing sale transactions occurring at the POS terminals 102, 104 and/or sales transactions stored on the payment device such as the IC card 100, and from the issuing entity 108 back through the payment network to the POS terminals 102, 104 and consequently the payment device such as the IC card device 100 approving or denying the sale transactions.

In an alternate embodiment, an agent (not shown) of the issuing entity 108, acting on behalf of the issuing entity 108, may communicate with the communications network 106 without involving the issuing entity 108 directly in the transaction.

Figure 1B:
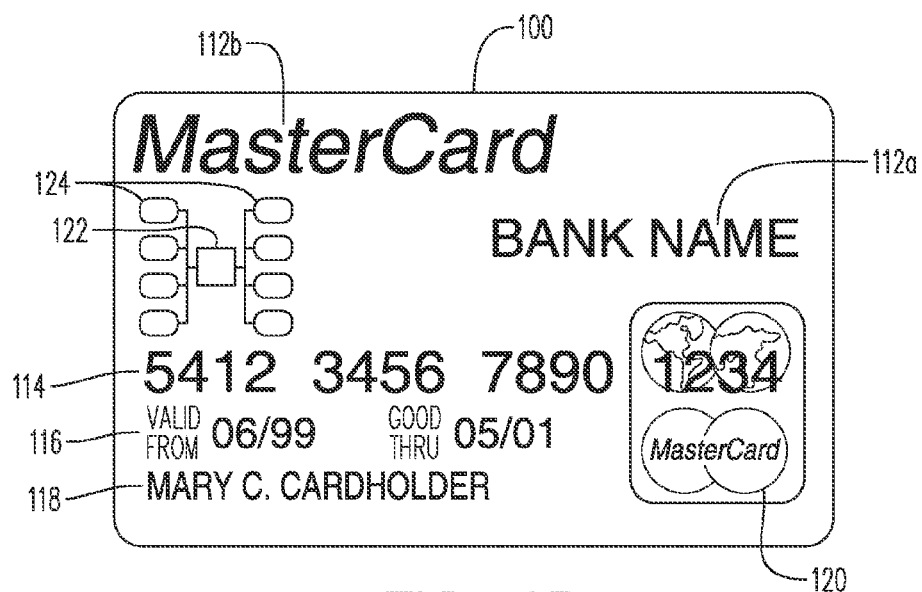
FIG. 1B is a diagram of a transaction card incorporating integrated circuit technology according to an exemplary embodiment of the present invention.

Preferably, the communications network 106 is a telecommunication network and/or private network. The issuing entity 108 maintains an account or similar authorization which supports any use of the IC card device for financial transaction. FIG. 1B illustrates one type of payment device such as an IC card device 100. The transaction card 100 incorporates integrated circuit technology into a conventional credit card. The transaction card 100 looks similar to a conventional credit card, but also includes an integrated circuit ("IC") 122, which contains a microprocessor, and electrical contacts 124 for communications between the IC 122 and devices external to the transaction card 100. The transaction card 100 can be used as a cash card, a credit card and/or a debit card or for other applications. Similar to a conventional credit card, the front side of the transaction card 100 preferably contains the name 112a of a financial institution that issues the card and/or the name 112b of a payment system (e.g. MasterCard®) under whose authority the card is issued, a cardholder's account number 114, the cardholder's name 118, dates 116 between which the card is valid and usable, and a brand 120 associated with the payment system.

In an alternate embodiment, the transaction card 100 may be replaced by any integrated circuit device. The integrated circuit device may have a form factor different than that of the transaction card 100. The integrated circuit device can be a mini-card, a key fob, a contactless IC card, and the like. The integrated circuit device includes the IC 122, which may not be visible. The integrated circuit device may utilize electrical contacts 124 for communications between the IC 122 and devices external to the integrated circuit device. Alternatively, the integrated circuit device may utilize different modes of communication with external devices including radio frequency communication and induction field communication.

In an alternate embodiment, the transaction card 100 may be replaced by a mobile wireless device such as a mobile phone, smartphone, PDA etc. that contains an integrated circuit device.

Figure 2:
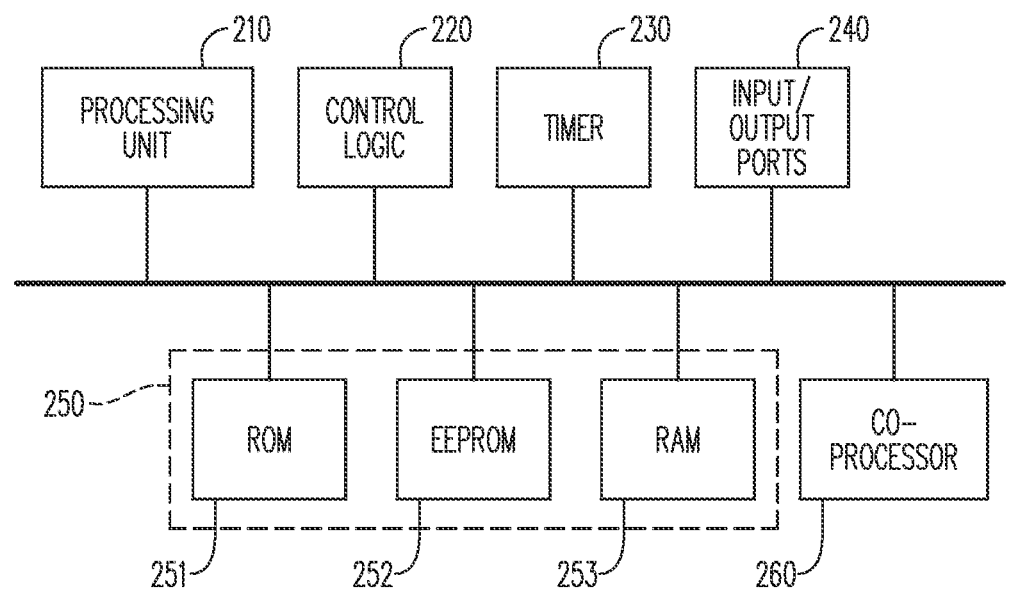
FIG. 2 is a functional block diagram of the integrated circuit section of the card illustrated in FIG. 1B according to an exemplary embodiment of the present invention.

FIG. 2 is a functional block diagram of an integrated circuit device that can be included in the payment device such as the IC 122 and contains at least processing unit 210 and memory unit 250. Preferably, the IC 122 also includes control logic 220, a timer 230, and input/output ports 240. The IC 122 can also include a co-processor 260. Control logic 220 provides, in conjunction with processing unit 210, the control necessary to handle communications between memory unit 250 and the input/output ports 240. The timer 230 provides a timing reference signal to processing unit 210 and control logic 220. Co-processor 260 provides the ability to perform complex computations in real time, such as those required by cryptographic algorithms.

Memory unit 250 may include different types of memory, such as volatile and non-volatile memory and read-only and programmable memory. Memory unit 250 stores transaction card data such as secret cryptographic keys and optionally a user's personal identification information such as a Personal Identification Number ("PIN"). Other forms of personal identification information can be stored such as biometric data. The secret cryptographic keys may be generated by any type of well-known cryptographic algorithm, such as the private keys of public-private key pairs or the keys of symmetrical encryption algorithms. Preferably, the secret cryptographic keys and optionally the user's personal identification information such as a PIN or biometric are stored in a secure area of EEPROM that is either not accessible or has very limited accessibility from outside the payment device such as the IC card device. Memory unit 250 stores the operating system of the IC card. The operating system loads and executes IC card applications and provides file management or other basic card services to the IC card applications. One operating system that can be used to implement the present invention is the MULTOS™ operating system licensed by MAOSCO Ltd. Preferably, the operating system is stored in ROM 251.

The non-volatile memory contains values for parameters that are of significance for each application. Preferably each application has its own reserved memory space that under normal circumstances cannot be accessed by any other application. This means e.g. that application that is active has accesses to memory space A; and application B that is active has access to memory space B. For example the non-volatile memory can contain data that signifies whether an application is blocked or not. Access to this part of the non-volatile memory is generally only accessible by the application for which the parameter(s) are relevant. Access to this part of memory may be made secure by encryption keys such as symmetrical keys. In accordance with embodiments of the present invention a part of the non-volatile memory assigned to a secondary application can be accessed by a primary application when active as described below.

In an alternate embodiment, flash memory or other non-volatile and/or volatile types of memory may also be used in the memory unit 250.

In addition to the basic services provided by the operating system, memory unit 250 may also include one or more IC card applications. For example, a MasterCard® M/Chip or M/Chip Advance application or a similar Credit/Debit application could be stored on card 100. Additionally, if the IC card is to be used as an electronic cash card, the MONDEX™ electronic cash application might be included on the IC card, which electronically loads onto the IC card a value of a certain currency from a cardholder's account in a financial institution. An application may include both program and data files, which may be stored in either ROM or EEPROM. Any of the above applications may be dormant as issued to the user. A dormant application cannot be activated by the user at a normal POS terminal.

Preferably, the memory unit 250 includes at least one unblocked primary application such as a payment application. The payment application can configure the transaction card 100 to behave like a credit card, a debit card, a pre-authorized amount card or a cash card. The memory may include at least one blocked application.

Figure 3:
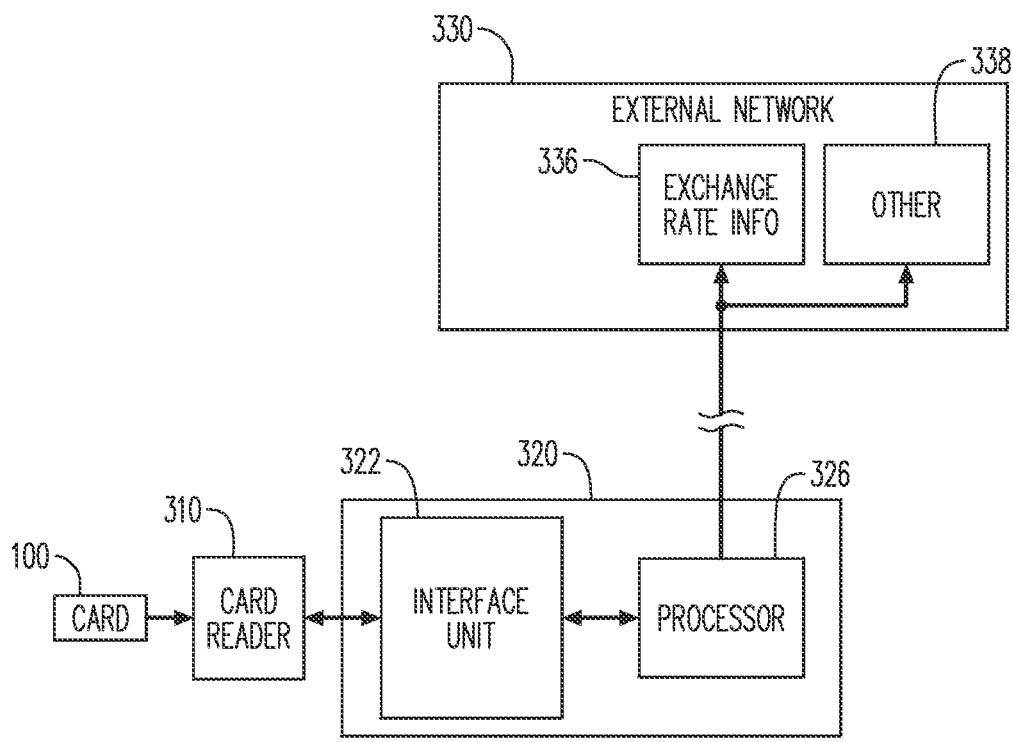
FIG. 3 is a block diagram of a part of the system of FIG. 1A using the transaction card of FIG. 1B according to an exemplary embodiment of the present invention.

FIG. 3 is a block diagram of a system 300 for reading information from the IC card device. System 300 includes a terminal 320. The term "terminal" generically describes devices with which the payment device such as an IC card device may communicate such as a kiosk-type interface terminal, a personal computer, a PDA, a mobile device, or a POS terminal, etc.

Within terminal 320 are interface unit 322 and processor 326. Interface unit 322 may consist of a combination of hardware and software, including a display screen, designed to communicate with a cardholder, and buttons keypads, or keyboards with which a cardholder inputs data to the terminal. Interface unit 322 may also include a card reader into which the cardholder inserts card 100 in order to exchange data. Alternatively, the card reader could be external to interface unit 322 as shown by card reader 310.

Processor 326 communicates with interface unit 322 and processes the commands and data provided to the terminal by the cardholder. Processor 326 also communicates with devices outside of the terminal and not directly accessible to the cardholder such as external network 330. This communication can be accomplished, for example, using standard short-distance and long-distance communication networks such as local-area and wide-area networks, or via telephone-based or wireless communication lines or dedicated transmission lines. The external network 330 may allow the terminal 320 to communicate with an exchange rate information computer 336, and the like.

Terminal 320 can be located in a store or other commercial establishment that accepts card 100 for the purchase of goods and services. Processor 326 can communicate with devices external to terminal 320 such as credit or debit card processing networks (not shown), to which credit, debit or pre-authorized amount card information can be sent and verification for the purchase can be received. This communication can be accomplished using conventional credit and debit card processing methods.

In a preferred embodiment, at least one dormant application on the IC card device can be unblocked, i.e. an entry or flag stored in non-volatile memory on the IC card 100 and accessible by the dormant application when active can be altered, i.e. unblocking, blocking or reblocking.

Figure 4:
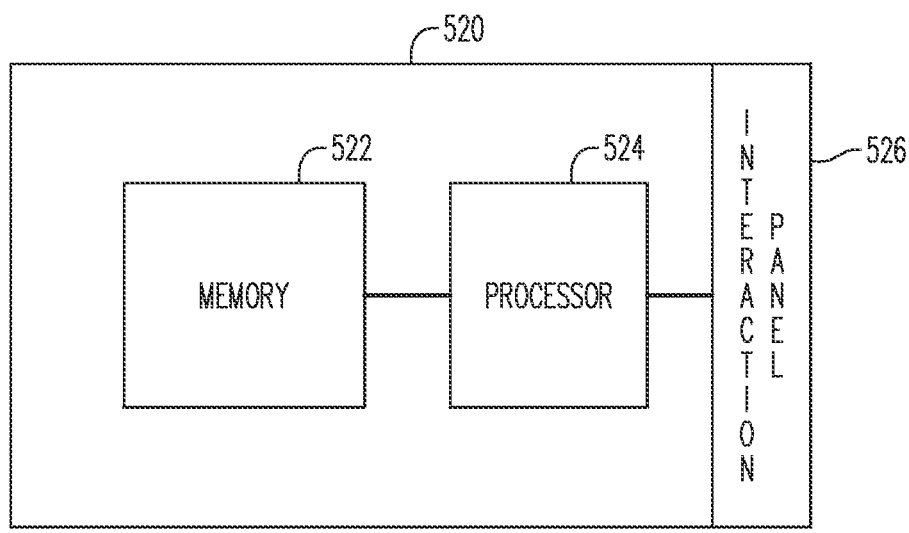
FIG. 4 is a functional block diagram of a terminal according to an exemplary embodiment of the present invention.

FIG. 4 is a block diagram of a transaction terminal. Each terminal 520 includes processor 524, connected to both memory 522 and interaction panel 526. Interaction panel 526 includes the display screens, the buttons with which menu options are chosen, the keypad or keyboard, the card receptacle or the card reader, the receipt dispenser or printer, and the refund dispenser. Processor 524 processes, controls, and outputs data to interact with the user via interaction panel 526. Processor 524 also controls memory 522 which stores dynamic information such as the options chosen by the cardholder during the current session and optionally the cardholder personal identification information such as the PIN, and static information such as transaction history.

Figure 5:
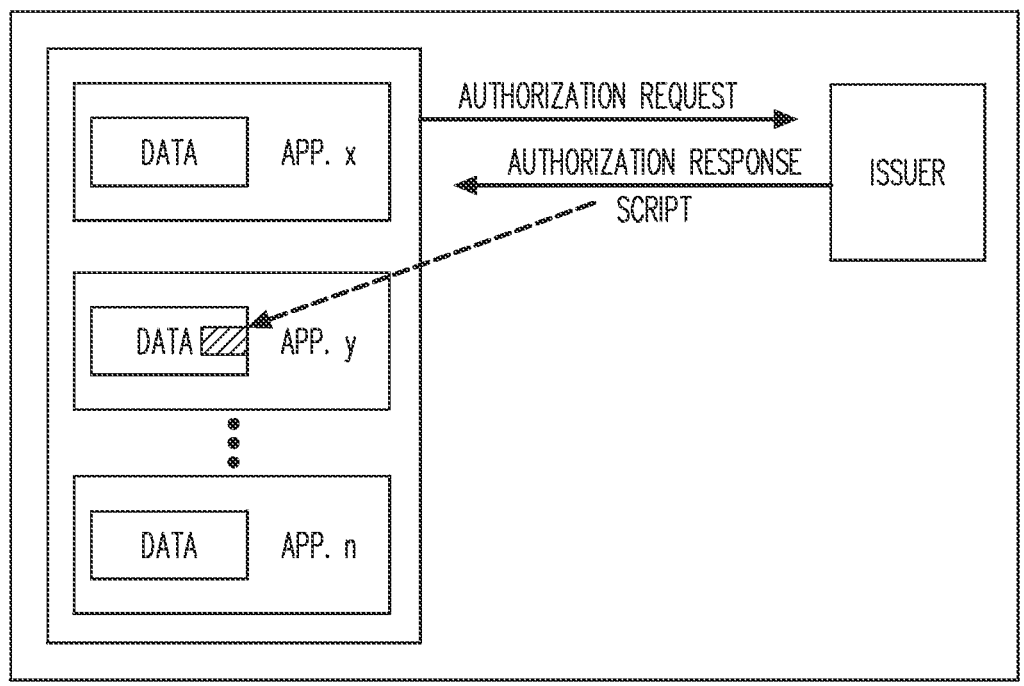
FIG. 5 and FIG. 6 show message flows in accordance with embodiments of the present invention.

An illustrative embodiment of the present invention will be described including Integrated circuit cards, that have been issued by an Issuer, the cards being able to run several M/Chip applications, i.e. they are combo cards or combicards. The payment applications are all controlled by the Issuer. With reference to FIG. 5, when a transaction is conducted online to the issuer via a primary application "x", the issuer updates, e.g. with a script in a response from the Issuer such as an authorization response, parameters of another application "y". Such an update of parameters can be, for example, unblocking, blocking or deblocking of the application y.

Generally, there is a strict firewalling between applications "x" and "y" and it is not possible to modify parameters of application "y" when application "x" is active. Furthermore, in some implementations secured updates of application "y" require, to compute the MAC on the script command processed by application "y", the knowledge of application "y" originated data (e.g. an Application Cryptogram). The EMV flow does not allow the communication of application y originated data when a transaction is conducted with application "x". As a consequence, it is generally not possible to update an application parameter when a transaction is done with another application on a standard terminal.

Before application of the methods of the present invention the user obtains the necessary rights and privileges from the Issuer to be able to use the primary and secondary applications. For example, the Issuer maintains a database which records bibliographic data with respect to each user as well as personal indicators such as PIN codes or biometric data such a iris scan, fingerprint etc. In addition the rights and privileges of each user are recorded. For example, the database will include information as to whether a specific application for the IC card device is available to the user or whether it is blocked. The user may change the parameters recorded in the database by any suitable method, e.g. by making a request by telephone, by a Short Message Service, by email, by filing in a form on a web-based application or in person at a bank, etc.

By means of embodiments of the present invention it is possible to address a script command to application "x" (the receiving application) from the network, e.g. from a terminal which will, eventually, update parameters of application "y" (the target application). In an embodiment, the security of the script command can be ensured by the receiving application without any loss of security as:

1. The protection of script commands uses identical cryptographic mechanisms for both applications. However, the same keys need not be used.
2. The same issuer is controlling both applications.

The present invention includes an optional limitation on any method system or IC card device according to the invention, that the updating of a second application (or further applications) when a first application is active is limited to the situation where the same issuer is controlling each and/or every application.

The present invention includes an optional limitation that a second application cannot be active when a first application is active.

In general, embodiments provide a single payment card with multiple payment applications stored on an IC chip. In the following description, a specific IC card, configured pursuant to the EMV standards (and further pursuant to MasterCard's M/Chip4 specifications) is described including several data elements, and commands which may be used to allow applications to be modified on the IC card. The illustrative embodiment allows the cardholder to select their preferred payment option in different environments, including, for example, at EMV compatible POS terminals, at EMV compatible ATM terminals, or in online transactions (e.g., via MasterCard SecureCode or based on a distinct primary account number associated with the card). The ability to activate or enable different applications at non-dedicated terminals provides cardholders with more choice, convenience and flexibility.

Figure 6:
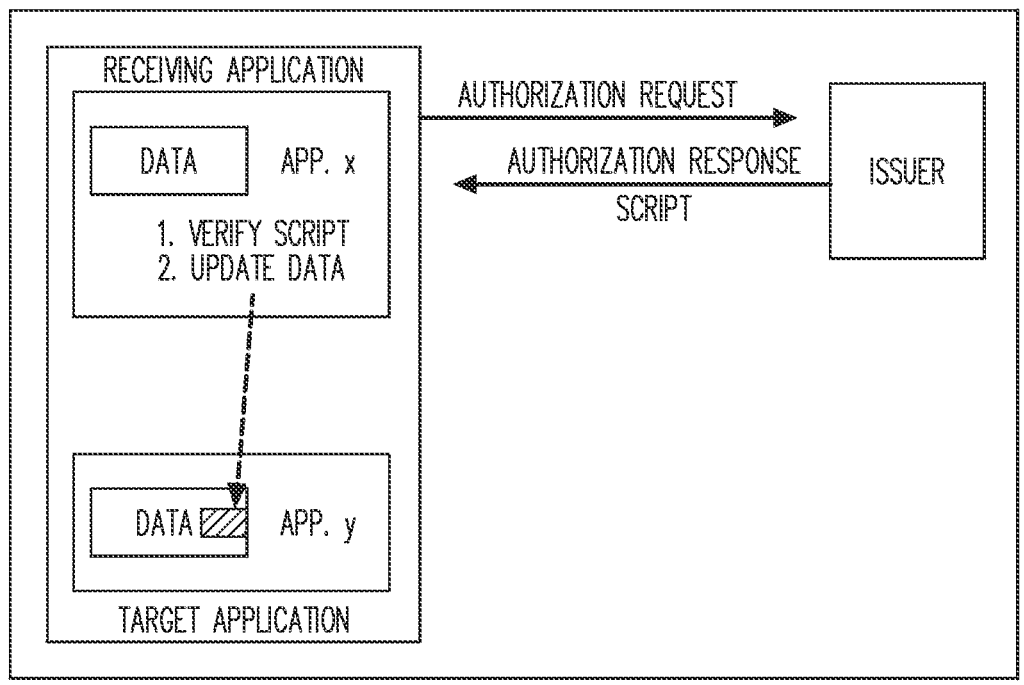

Referring now to FIG. 6, embodiments of the present invention use a script command for inter-application communication on the IC card device. In general, the inter-application communication is an on-card mechanism. To achieve this, a command that is used to store data in non-volatile memory such as a "Put Data" command can be used for a new data element. Pursuant to some embodiments, this data element has the following fields:

Meta Data has the following format:

| Field | Length | Values |
|---|---|---|
| Version Number | 1 | '00' Other values RFU. |
| Update Field | Var. | See below. |

The purpose of the meta data is to inform the active primary application that the data sent with the request is for a secondary inactive application. Hence the most important field is the Update Field which controls this process.

Embodiments of the present invention can include the limitation that only certain requests sent from the IC card device to the issuer can be the trigger for the Issuer to send the script to update a parameter of a secondary application on the card. For example the script can be included in the response from the Issuer to an authorisation request from the IC card device.

For Version Number '00', Update Field has the following format:

| Field | Length | Values |
|---|---|---|
| Target Application | 1 | '00': This Application 'yy': Application yy 'FF': By AID |
| Length of AID (only present if Target Application = 'FF') | 1 | '05'-'10' |
| AID (only present if Target Application = 'FF') | '05'-'10' | AID of Target Application |
| Target Data ID | 2 | ID of data to update/process |
| New Value | Var. | Value of data to update/process |

The target application has to be defined, that is, it is required to specify whether the update is for the active primary application (value "00") or for a secondary inactive application on the card. The secondary inactive application can be defined by any of a variety of methods such as by an index in a table ("yy"), by reference to an Application ID ("FF"), etc. If an Application ID ("AID") is to be used, a separate field can provide the length of the AID. Similarly the target data (the parameter to be updated), may also be specified by an identification such as the Target Data ID. The value to be updated is specified in the New Value field. This value will be written into the non-volatile memory at the appropriate position. For example, to be able to write a value into a part of the non-volatile memory reserved for the secondary application, the IC card device is adapted—for example, the microprocessor and programs running thereon are adapted to share necessary keys between the primary and secondary applications and to be able to access this part of the non-volatile memory. In some cases a parameter change may not involve a direct communication between two applications. It may, e.g., suffice that the active application when presenting a predefined key known to the second application is permitted to change a certain e.g. predefined parameter value that is present in a memory location that can only be accessed by the second application when it is active.

This target data is defined in the next fields.

The following Target Data IDs may be supported:

| Target Data ID | Name | Length | Values |
|---|---|---|---|
| '0000' | Block Status | 1 | '00': Unblocked '01': Blocked Other values RFU |
| '00A5' | FCI Proprietary Template | Var. | Any EMV Compliant Value |

For example if the Target Data ID field is '00A5', the FCI is to be updated with the New Value provided in the following bytes of the Update Field. This value is shown as "Any EMV Compliant Value". When an update of the FCI data is performed, the FCI of the target application is modified. This data is used by the application for payments, and is one example of the kind of data that can be updated using embodiments of the present invention. For clarity, "Any EMV Compliant Value" in the table above generally refers to any FCI value allowed by the EMV standards, and the target application will just replace the current FCI value with the new value.

As a second example, if the Target Data ID is '0000', then an update of the Block Status is performed and the target application is either "blocked" (if the New Value is '01') or "unblocked" (if the New Value is '00').

The value to be written into the non-volatile memory based on the target data ID and that is associated with the secondary application is a parameter of the secondary application. For example it can define that this application is blocked or unblocked. By setting these values an application can be unblocked, blocked or reblocked.

The user should be able to see any unblocked application when using the card with a terminal. For this purpose the appropriate display characters are defined as the FCI Proprietary template. These will be displayed, e.g. on an LED or LCD display at the POS or ATM terminal and means can be provided for the user to select which application he or she wishes to use. Such a means can be a keypad or similar. For example, a cardholder carrying a combo card pursuant to the present invention may present the card for use at a POS terminal or ATM terminal to conduct a transaction. Once the card data has been read (for example, pursuant to an EMV compliant interaction between the card and a reader associated with the terminal), a display device at the terminal may offer the cardholder a choice to use any of the unblocked applications on the card (e.g., credit, debit or the like). The cardholder may then interact with the terminal to select which payment application she wishes to use for the transaction. This provides cardholders with an ability to use different payment applications from just a single payment card.

Referring again to the data elements and in particular to the addressing of a target application pursuant to some embodiments, target addressing may be implemented as follows, all of which are embodiments of the present invention.

An example of how the addressing of the target application can be implemented is as follows. The skilled person will appreciate that this is just one example and various alternatives could be conceived by the skilled person.

Target Application='00' (The primary Application that is active)

The target application is the application currently selected.

Target Application='yy' (Application 'yy')

The target application is application 'yy' which is not active, e.g. is a dormant application. This assumes that applications are assigned characters such as alphanumeric characters or numbers known to the Issuer.

Target Application='FF' (By AID)

In this case, an AID is present in the Update Field. The target application is the application with this AID. In general, a full match is required between the AIDs in order to perform an update.

Pursuant to some embodiments, the "Put Data" is processed on the Meta Data as follows. The following description relates to commands and data elements associated with MasterCard International's M/Chip4 standard, and are used for illustrative purposes only; those skilled in the art, upon reading this disclosure, will appreciate that similar processing may be performed in other environments to allow the update of applications pursuant to the present invention. In the following, pseudo code is described for processing an update of data to a card which refers to a "PTH" data element such as that used in the M/Chip4 standard. The PTH data element is generally used to store various elements of data (such as information regarding whether an application is blocked, whether a script has previously failed, etc.). Other standards or payment card specifications may provide a similar data storage element. Reference to the "PTH" element is for illustrative purposes only.

In the following pseudo code, several conventions are used (which follow those generally used in M/Chip4 standard), as follows. To refer to a specific byte of a multi-byte data element, a byte index is used under brackets (i.e. "[_]"). For example, Card Verification Results [4] represents the 4th byte of the Card Verification Results. The first byte of a data element has index 1. To refer to a specific bit of a multi-bit data element, a bit index is used under brackets "[_]". For example, Previous Transaction History [7] represents the 7th bit of the Previous Transaction History. The first bit of a data element has index 1. To refer to a specific bit of a multi-byte data element, a byte index and a bit index are used under brackets (i.e. [_] [_]). For example, Card Verification Results [2] [4] represents the 4th bit of byte 2 of the Card Verification Results.

The pseudo code "SAVE Previous Transaction History [1] ('1b')" means the following occurs "Change the value of the 1st bit of the PTH to 1 (binary), keep the value of the other bits unchanged. Then save this new value of the PTH in non-volatile memory." Note that if PTH[1] was already set to 1 (binary) there is no actual change in the value, but it does not matter here, we want to force the value of the bit after the processing, irrespective of the initial value.

The Target Application is found as described above for Target application addressing.

If the Target Application does not exist, 'script failed' is set in PTH of Receiving Application (where the storage element PTH is used to store the outcome of the attempt to update the target application—if the attempt fails, the PTH stores that fact to be communicated to the issuer in a subsequent transaction, for example):

SAVE Previous Transaction History [1]('1b') and reject C-APDU ('6985').

If the Target Application is disabled (Previous Transaction History [6] in Target Application='1b'), 'script failed' is set in PTH of Receiving Application (in general, a "disabled" application is dead, and cannot be unblocked, and this check just confirms—if the application is dead, don't update it):

SAVE Previous Transaction History [1]('1b')

and reject C-APDU ('6985').

If the Target Data ID='0000' (Block Status)
  If Block Status Value='00' (Unblocked)
  Unblock Target Application:
    SAVE Previous Transaction History [5]('0b') in Target Application (in this step, the PTH is used to store the "blocked"/"not blocked" status of the target application).
  If Block Status Value='01' (Blocked)
  Block Target Application:
    SAVE Previous Transaction History [5]('1b') in Target Application.
  If Block Status Value=Other value:
    set 'script failed' in PTH of Receiving Application:
    SAVE Previous Transaction History [1]('1b')
    and reject C-APDU ('6985').

If the Target Data ID='00A5' (FCI Proprietary Template) (in this processing step, the FCI of the target application is updated. The mechanism can be used to update many other parameters, however, in this embodiment, the processing is illustrated as only affecting the FCI.)

Replace the value field of the FCI Proprietary Template (Tag 'A5') in the FCI (Tag '6F') of the Target Application with the new value.

Update the length of the FCI Proprietary Template (Tag 'A5') in the FCI to reflect the replacement.

Update the length of the FCI Template (Tag '6F') to reflect the replacement.

If error, set 'script failed' in PTH of Receiving Application:
    SAVE Previous Transaction History [1]('1b')
    and reject C-APDU ('6985').

Note: only the value of the FCI Proprietary Template is present in subfield New Value (no TLV is present).

From a script processing perspective, only the receiving application on the IC card device has performed the script which sets: (1) the script failed bit in the PTH, (2) the script received bit in the PTH, and (3) the script counter. These items are modified in the receiving application, but not in the target application. In general, a feature of the present invention is to use the tag values as Target Data ID when updating tagged data. For example, if other data is to be updated, the Target Data ID used would be the identifier already defined (in the specifications defining the application) for the data to be updated.

The above descriptions of processes herein should not be considered to imply a fixed order for performing the process steps. Rather, the process steps may be performed in any order that is practicable, including simultaneous performance of at least some steps. Although embodiments are described with reference to illustrative messages and data elements, other message names, data elements, or the like may be used.

Embodiments may be used to provide payment cards for cardholders that include a number of different applications, some of which may be inactive when issued. For example, a cardholder may be issued a card that has a debit application activated at issuance, but that also has one or more dormant applications thereon, such as a credit application, a prepaid application, a commercial credit application, a decoupled debit application, and a loyalty application. As the cardholder builds credit or becomes interested in activating other applications, those applications can be activated at normal transaction terminals. Embodiments allow interactions with an active application to modify details of inactive applications in order to activate those inactive applications.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
receiving an authorization request at an issuer from a mobile device, to update a parameter associated with a secondary application using a primary application on the mobile device;
sending an authorization response from the issuer, the authorization response including a script for being performed by the primary application on the mobile device to cause an update to the parameter associated with the secondary application on the mobile device, said parameter stored in a nonvolatile memory in said mobile device.

2. The method of claim 1, wherein the secondary application is a dormant application and the script is for unblocking the dormant application.

3. The method of claim 1, wherein the script is for blocking or unblocking the secondary application.

4. The method of claim 1, wherein the mobile device includes a SIM card.

5. The method of claim 1, wherein at least one of the primary and secondary applications is at least one of a credit application, a debit application, a loyalty application and a prepaid application.

6. The method of claim 1, wherein the script includes data which identifies the secondary application as a target application for the update.

7. The method of claim 1, wherein the script includes a data field which contains an updated value for the parameter.

8. The method of claim 1, further comprising:
prior to said receiving the authorization request, receiving an indication from a user of the mobile device to indicate that the user desires to update the parameter.

9. The method of claim 8, wherein the indication from the user is received via telephone, Short Message Service, email, web-based application or by communication in person.

10. The method of claim 1, wherein the primary application uses a secondary key which controls access to a memory area of the nonvolatile memory reserved for the secondary application in order to update the parameter, the secondary keys being shared with the primary application for performing the updating.

11. A method comprising:
storing a first application in a mobile device;
reserving a first memory area for use by the first application, access to the first memory area controlled by a first key, the first memory area in a nonvolatile memory included in the mobile device;
storing a second application in the mobile device;
reserving a second memory area for use by the second application, access to the second memory area controlled by a second key, the second memory area in a nonvolatile memory included in the mobile device;
sharing the second key with the first application;
using the second key by the first application to update a parameter of the second application in the second memory area by performing a script received by the mobile device.

12. The method of claim 11, wherein the updated parameter unblocks the second application.

13. The method of claim 11, wherein the updated parameter blocks the second application.

14. The method of claim 11, wherein the script was generated by an issuer of a payment account.

15. The method of claim 14, wherein at least one of the first and second applications is a payment application.

16. A method comprising:
receiving a script in a mobile device from an issuer;
reading the received script by a first application that is active in the mobile device to identify a second application that is stored in the mobile device;
updating, by the first application, parameter data of the second application with the received script; and
storing, by the first application, the updated parameter data in a memory area reserved for the second application, the memory area in a nonvolatile memory included in the mobile device.

17. The method of claim 16, wherein the second application is dormant when the script is received in the mobile device.

18. The method of claim 17, wherein the storing of the parameter data in the memory area reserved for the second application causes the second application to be unblocked.

19. The method of claim 16, wherein the storing of the parameter data in the memory area reserved for the second application causes the second application to be blocked.

20. The method of claim 16, wherein the script was generated by the issuer of a payment account.

21. The method of claim 20, wherein at least one of the first and second applications is a payment application.

22. The method of claim 16, wherein the first application uses a second key which controls access to a memory area of the nonvolatile memory reserved for the second application in order to store the parameter data, the second keys being shared with the first application for storing the parameter data.

* * * * *